(12) United States Patent
Danna et al.

(10) Patent No.: US 12,485,816 B2
(45) Date of Patent: Dec. 2, 2025

(54) SYSTEM FOR CONTROLLING A LIGHT ASSEMBLY OF A VEHICLE

(71) Applicant: ITALDESIGN-GIUGIARO S.P.A., Turin (IT)

(72) Inventors: Fabio Danna, Monastero di Vasco (IT); Domenico Pignatale, Turin (IT); Mirko Ballarini, Turin (IT)

(73) Assignee: ITALDESIGN-GIUGIARO S.P.A., Turin (IT)

( * ) Notice: Subject to any disclaimer, the term of this patent is extended or adjusted under 35 U.S.C. 154(b) by 149 days.

(21) Appl. No.: 18/257,875

(22) PCT Filed: Dec. 17, 2020

(86) PCT No.: PCT/IT2020/000081
§ 371 (c)(1),
(2) Date: Jun. 15, 2023

(87) PCT Pub. No.: WO2022/130418
PCT Pub. Date: Jun. 23, 2022

(65) Prior Publication Data
US 2024/0092254 A1    Mar. 21, 2024

(51) Int. Cl.
*B60Q 1/26* (2006.01)

(52) U.S. Cl.
CPC ........ *B60Q 1/2607* (2013.01); *B60Q 2900/30* (2013.01); *B60Q 2900/50* (2022.05)

(58) Field of Classification Search
CPC .............. B60Q 1/2607; B60Q 2900/30; B60Q 2900/50; B60Q 1/26
See application file for complete search history.

(56) References Cited

U.S. PATENT DOCUMENTS

| | | | | |
|---|---|---|---|---|
| 10,688,920 | B1* | 6/2020 | Neubauer | B60Q 1/507 |
| 2012/0299476 | A1* | 11/2012 | Roberts | B60Q 1/2607 |
| | | | | 315/77 |

(Continued)

FOREIGN PATENT DOCUMENTS

| | | | |
|---|---|---|---|
| CN | 207692107 U | | 8/2018 |
| CN | 111301276 A | * | 6/2020 |

(Continued)

OTHER PUBLICATIONS

International Search Report, issued in PCT/IT2020/000081, mailed Aug. 27, 2021, Rijswijk, NL.

*Primary Examiner* — Abdullah A Riyami
*Assistant Examiner* — Syed M Kaiser
(74) *Attorney, Agent, or Firm* — Valauskas Corder LLC

(57) ABSTRACT

A system for controlling a light assembly of a vehicle is provided. The light assembly has an array of light sources adapted to perform at least one lighting or light-signaling function of the vehicle. The system has a user interface computer environment for light configuration of the light assembly arranged to acquire from a user a lighting shape of the array of light sources, associated with a predetermined lighting or light-signaling function of the light assembly, a processing and control system residing on board the vehicle, adapted to select a plurality of light sources of the array, the lighting of which implements or approximates implementation of the acquired lighting shape, and a drive unit for the array of light sources adapted to control activation of the plurality of light sources selected to perform the predetermined lighting or light-signaling function.

11 Claims, 3 Drawing Sheets

(56) References Cited

U.S. PATENT DOCUMENTS

2014/0375448 A1    12/2014  Lee
2016/0332562 A1    11/2016  Kim
2018/0086254 A1*   3/2018  Morel ...................... B60Q 1/04
2018/0299092 A1*  10/2018  Orisich .................. G02B 6/001

FOREIGN PATENT DOCUMENTS

DE        102017208837 A1   11/2018
GB           2554103 A    3/2018

* cited by examiner

SYSTEM FOR CONTROLLING A LIGHT ASSEMBLY OF A VEHICLE

CROSS-REFERENCE TO RELATED APPLICATIONS

This application is a U.S. National Phase filing of PCT International Patent Application No. PCT/IT2020/000081, having an international filing date of Dec. 17, 2020 which is hereby incorporated by reference in its entirety.

FIELD OF THE INVENTION

This invention relates to vehicles and more specifically to vehicle light assemblies.

More particularly, the present invention relates to a system for controlling a light assembly or light of a vehicle.

BACKGROUND OF THE INVENTION

The term "light assembly" indicates without distinction either a headlight assembly or a taillight assembly, adapted to generate a light beam for lighting and/or signaling. A headlight assembly generally comprises low-beam and high-beam headlamps, a position light or DRL, and at least one turn signal. A taillight assembly generally comprises a tail light, a brake light and at least one turn signal.

In the past, the lighting and signaling functions of a vehicle were carried out by means of a single lamp or a few lamps, exploiting the effects of reflectors and lenses to direct and collimate the light beam. Over the years, the miniaturization of lamps and of the related power supply devices and their replacement with light guides and LEDs has made it possible to free oneself from circular or quadrangular shapes of the light assemblies and has offered greater freedom of design that has been exploited by automotive manufacturers to characterize in a personalized way the incorporation of the light assemblies into the vehicle body as well as the lighting shape perceived by outside observers.

At present it is known to obtain a lighting or light-signaling function of a vehicle by means of an array of light sources, arranged in a predetermined region of the light assembly, with a shape restricted by the effect of the design, and it is also known to design a plurality of lighting shapes for obtaining respective integrated lighting or signaling functions—also in an interleaved way—in the overall area of the light assembly. One embodiment is the exemplifying taillight assembly 10 shown in FIG. 1 including a C-shaped lighting shape 12 (or inverted C in the symmetrically opposite assembly) for performing the tail lighting function, a rectangular lighting shape 14, inserted in the space inside the C-shape 12 for performing the brake signaling function, and an underlying linear segment lighting shape 16 for performing the turn signaling function, possibly with lighting animation, i.e. with sequential lighting of the sources from one end of the segment to the other. Each light area or line is obtained by lighting respective pluralities of light sources (one of which is marked with the reference L by way of example) arranged on single or parallel rows belonging to functionally distinct sectors of the light assembly.

In a light assembly including an array of light sources adapted to perform at least one lighting or light-signaling function of the vehicle it is desirable to be able to enhance the possibilities of creating lighting shapes for performing respective lighting or signaling functions.

SUMMARY OF THE INVENTION

The object of this invention is to provide a light assembly with enhanced possibilities for creating lighting shapes associated with predetermined lighting or signaling functions of the light assembly.

According to the present invention, this object is achieved by a system for controlling a light assembly of a vehicle as described and claimed herein.

Particular embodiments are also described.

In summary, this invention is based on the principle of implementing a light assembly of a vehicle by means of an array of light sources, the attribution of which to a specific lighting or signaling function of the vehicle is programmable by a user, so as to provide full freedom in defining the lighting shapes for each lighting or signaling function.

Advantageously, this invention has a preferred application in the context of customizing the shape and size of a tail light and more generally of a light intended for a signaling function (such as for example a brake light or a rear turn signal light), not only outside the vehicle, but also inside of it (for example, courtesy lights). Customizations of shape and size of headlamps and more generally of a light intended for a lighting function are not excluded, although these must in any case satisfy the technical requirements of ensuring a correct lighting of the roadway in front of the vehicle in all driving conditions.

A user may draw on his own personal device, such as a tablet or smartphone, a desired lighting shape for a light of a light assembly, and the system subject of the invention, via a software application that is local or remote to the vehicle, is able to recognize the allowed shapes and, if so, communicate the lighting shape to be reproduced to a drive unit of the light assembly, for example via a short-range wireless communication protocol (Wi-Fi, ZigBee, Bluetooth or the like).

The invention therefore allows for a use experience of one's own vehicle, or of a vehicle temporarily hired, that is enhanced and personalized in the aesthetics (shape and dimensions) of a visible and characterizing part of the vehicle and also allows for a further extension of the experience by sharing with other users, for example through a software platform on which one's lighting shape designs may be made available and opinions and suggestions may be exchanged.

BRIEF DESCRIPTION OF THE FIGURES

Further features and advantages of this invention will become clear from the detailed description that follows, given purely by way of non-limiting example and with reference to the accompanying drawings, wherein.

DETAILED DESCRIPTION

Figure 2:
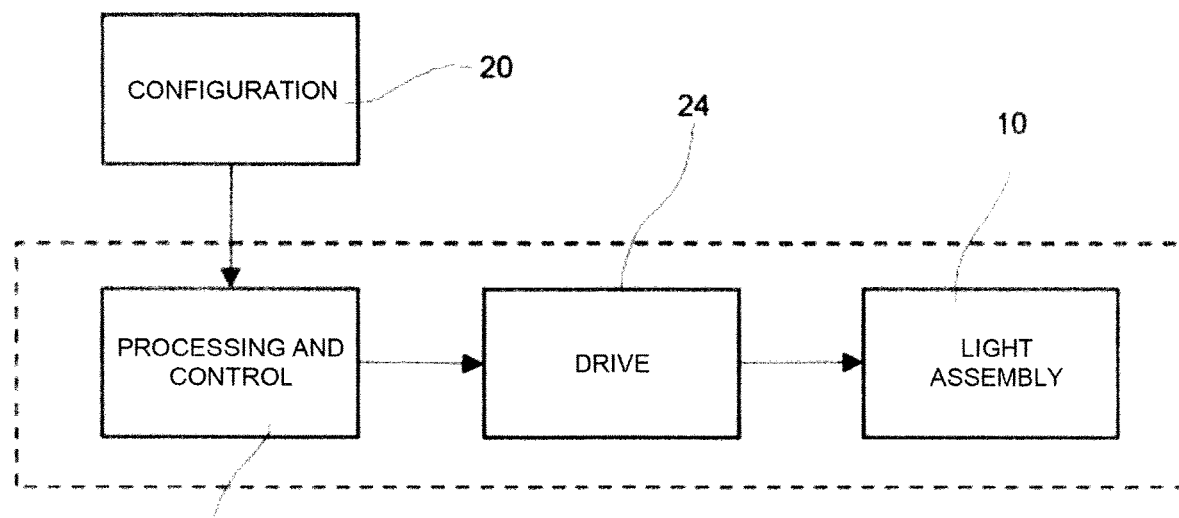
FIG. 2 is a block diagram of the system subject of the invention.

In FIG. 2 a light assembly of a vehicle including an array of light sources is indicated with 10, and a system for controlling the light assembly comprises a setting portion, which may be integrated in the infotainment system on board the vehicle or may be external to the vehicle and accessible from an appropriate user interface and communication device, and a control portion on board the vehicle (indicated in the figure with the dashed area).

The light sources are preferably monochromatic LEDs or polychromatic (RGB) LEDs, each of which may advantageously be controlled individually. An array of LEDs may lie on a flat or curved surface and harmoniously adapt to the aesthetics of the light assembly (ribs, profiles).

The setting portion includes light configuring means 20 of the light assembly, arranged to acquire from a user a desired lighting shape for the array of light sources, associated with a predetermined lighting or signaling function of the light assembly. The control portion includes processing and control means 22 residing on board the vehicle and coupled to the light assembly, adapted to receive data indicative of the lighting shape desired by the user and to select a plurality of light sources of the array, the illumination of which implements or approximates the implementation of said lighting shape, and drive means 24 for controlling the array of light sources adapted to control the activation of the plurality of light sources selected to perform the predetermined lighting or light-signaling function.

In a currently preferred embodiment, the configuration means of the setting portion include a user interface computer environment 20 advantageously implemented as an application residing on a user's personal mobile telecommunication device, arranged for setting a preferred lighting shape for the array of light sources of the light assembly and to remotely send the data indicative of said lighting shape to the processing and control means 22. Said setting may occur, for example, by drawing freehand directly in an area of the screen of the device via a stylus or other writing means, in a guided way via the combination of preset geometric shapes, or by acquiring a previously traced design image via a communication network.

Figure 1:
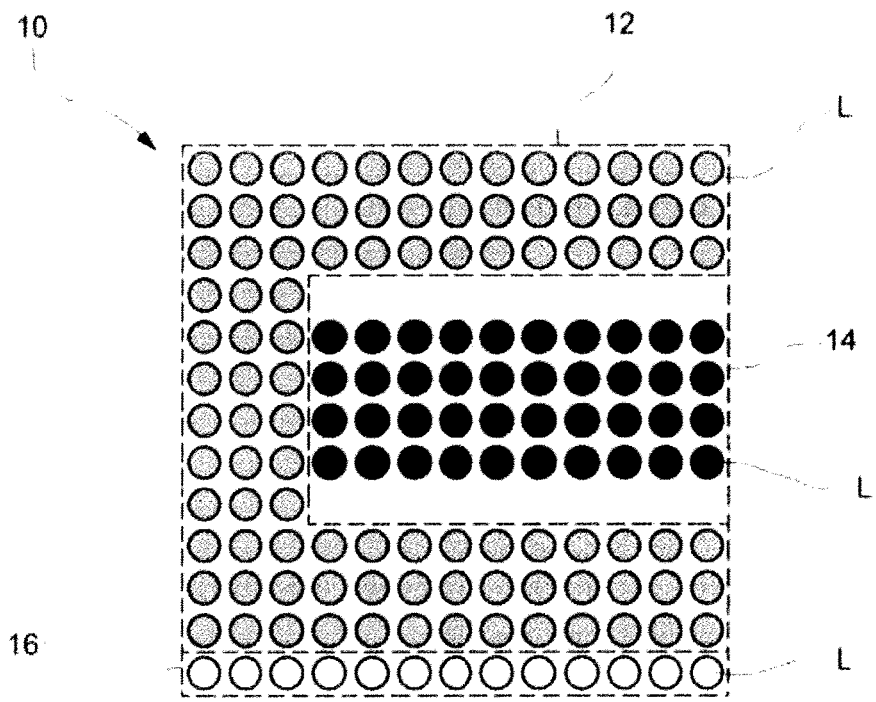
FIG. 1 is an exemplifying representation of a light assembly of a vehicle including an array of light sources according to the prior art, already described previously.
Figure 3A:
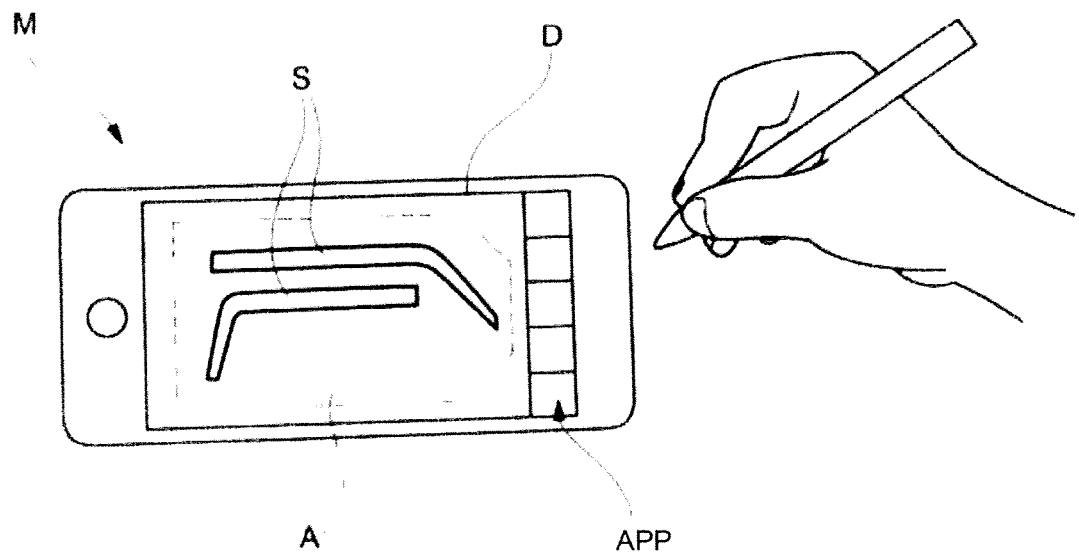
FIGS. 3a and 3b are respectively a design and an embodiment of a lighting shape of a light assembly according to the invention.
Figure 3B:
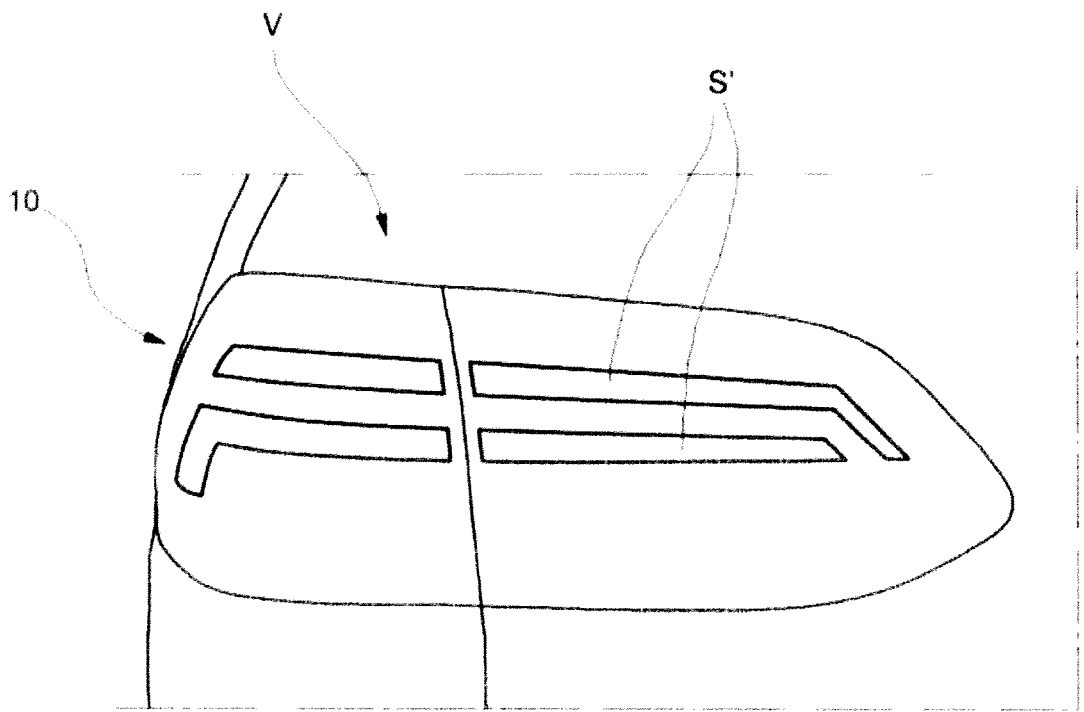

FIGS. 3a and 3b respectively show the design of a lighting shape S of a taillight assembly of a vehicle on a screen D of a user's personal mobile telecommunication device M, wherein a user interface computer environment APP is running provided for this purpose, and its realization S' on a real light assembly 10 of a vehicle V. The figure does not show the plurality of light sources in order not to weigh down the drawing, but they must be understood as present in the same way as illustrated by way of example in the embodiment of FIG. 1.

A programmable area A is defined in the overall area of the light assembly, the design of which the user may modify, displayed on the screen within a contour line, restricted to the geometry of the light assembly. If the user designs a single lighting or signaling function (for example, the lighting shape of a tail light) the whole programmable area may be used, if the user designs multiple lighting or signaling functions (for example, the lighting shapes of a tail light and a turn signal) the usable area for each function is indicated to the user in compliance with any regulatory restrictions in the relationships between said areas.

Advantageously, the user interface computer environment is arranged for setting a plurality of lighting shapes for the array of light sources, associated with a predetermined lighting or signaling function of the light assembly, and for the association of each of them to a corresponding selection condition, which includes at least one among a time, a place, and a driving condition. In this way, the user has the option of creating variable lighting shapes for the same function, for example depending on the time of day or the road traveled, for example by differentiating the lighting shapes between driving during the day or during the night, between city travel or travel on high-speed roads. The system thus makes it possible to plan in advance which lighting shapes to adopt automatically from a plurality of previously designed lighting shapes saved in a memory device.

Equally advantageously, the computer environment is arranged for the preventive comparison of the acquired lighting shape of the array of light sources with predetermined geometric shape features to assess compliance with predetermined standardized homologation features for a related lighting or signaling function, or for the prior comparison with a collection of lighting shapes that are not admissible because they are protected by the exclusive rights of third parties, possibly within a predetermined degree of similarity by means of known image comparison algorithms. The lighting shape is rejected if it corresponds to an inadmissible lighting shape.

In an alternative embodiment, the comparison of the desired lighting shape with a collection of inadmissible lighting shapes may be carried out on board the vehicle, in which case the processing and control means 22 are arranged to compare the arrangement of the plurality of selected light sources, the activation of which is intended to obtain the predetermined lighting or light-signaling function with the collection of inadmissible lighting arrangements. The lighting arrangement is rejected if it corresponds to an inadmissible lighting arrangement.

In the light assembly, the array of light sources comprises sub-arrays of light sources—and therefore corresponding areas—intended for respective lighting or light-signaling functions, and in one embodiment the computer environment is arranged to compare the lighting shape acquired with an available lighting area of the sub-array, intended for the lighting or light-signaling function associated with said lighting shape. The acquired lighting shape is rejected if it is not entirely comprised within said available lighting area.

Alternatively, if the acquired lighting shape is not entirely comprised within the available lighting area, the processing and control means 22 are adapted to select a plurality of light sources of the sub-array of said array intended for the lighting or light-signaling associated with the lighting shape, the illumination of which implements or approximates the implementation of said lighting shape, or to reject the lighting shape entered by the user.

The drive means 24 are adapted to control the on/off state, the level of light intensity and/or the color of the plurality of light sources selected to perform the predetermined lighting or light-signaling function, as well as the on/off frequency. This advantageously allows the use of the same sub-array of the array of light sources for different signaling functions, such as tail and brake lights—the brake lights operating at a higher luminous intensity than the tail lights—or tail light and turn signal—the turn signals operating with a different color from the tail light. In an improved embodiment, wherein it is desired to create an animation effect of the lighting of a plurality of light sources (for example, of the light sources belonging to a sub-array of the array of light sources selected for the signaling function of a turn signal) the drive means are adapted to intermittently control the switching on and off of the plurality of selected light sources at an intermittence time interval less than the retinal persistence time. Anti-aliasing techniques may be employed to improve the perception of continuity of the contours of the lighting shapes.

Figure 4:
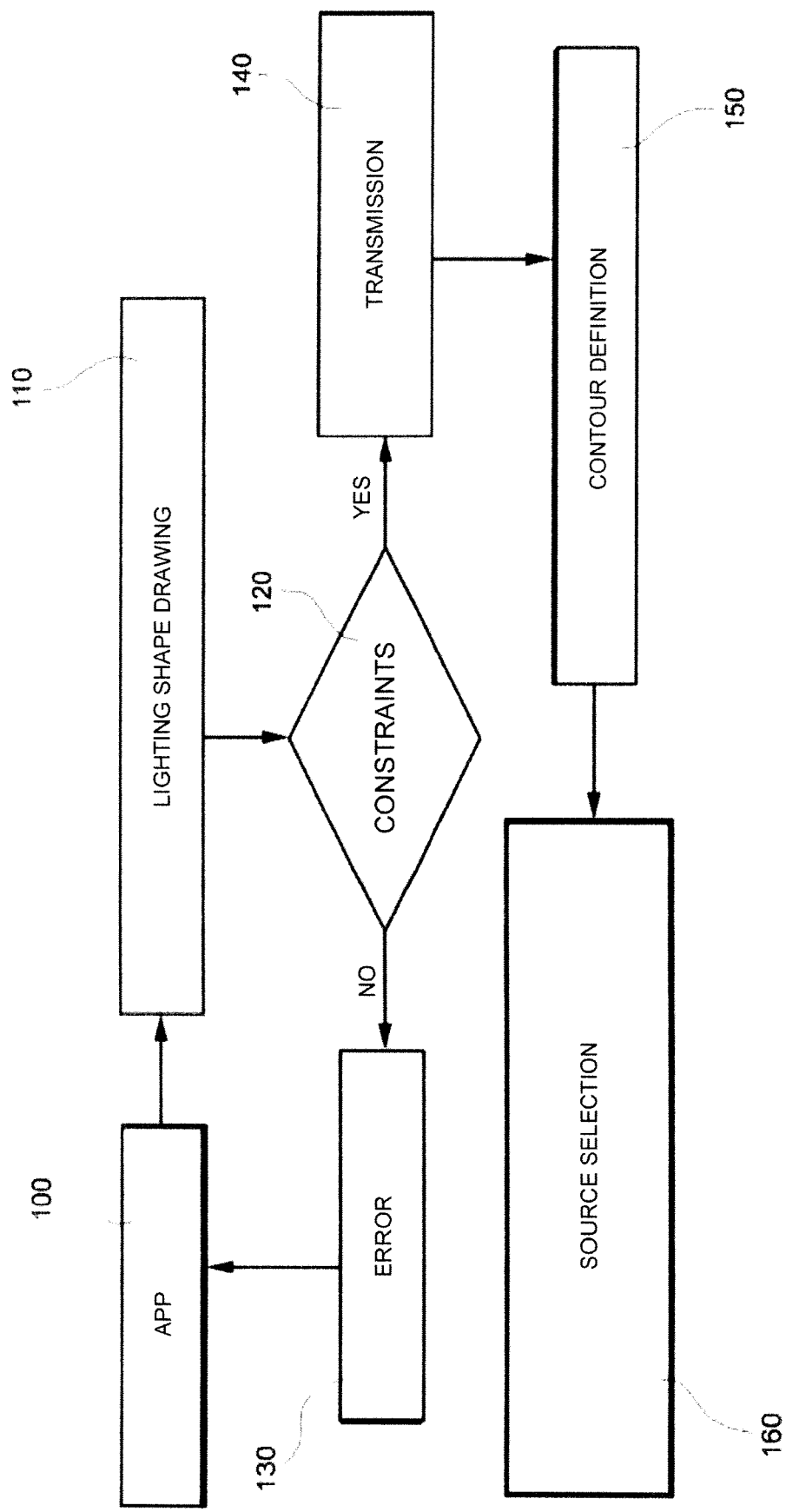
FIG. 4 is a flow diagram of a configuration method of a light assembly according to the invention.

With reference to FIG. 4, a possible flow diagram of a process for configuring a light assembly according to the invention is described.

In step 100 a user accesses a predetermined computer environment, such as an application APP of the automotive manufacturer of the user's vehicle, on the user's mobile communication device M, selecting the lighting or signaling function that the user intends to design, and possibly selecting the reference light assembly of the design between a headlight assembly and a taillight assembly (or other vehicle lighting device or assembly), and between a right, left or center light assembly.

In step 110, via the application, the user draws a desired lighting shape or imports an image previously drawn in that environment or in another environment. In step 120, the application compares the lighting shape drawn with predetermined size, shape and light intensity constraints, for example according to the ECE, SAE, CCC regulations, as well as with shapes that are not admissible for other reasons, including shapes protected by exclusive rights of third parties. If the lighting shape drawn is rejected because it is not admissible, in step 130 the application generates an explanatory error message, and the process restarts from step 100. If, on the other hand, the lighting shape drawn is admissible, the application transmits its representative data (in a known format) to the processing and control means 22 of the light assembly at step 140, through a short-range wireless transmission protocol.

The processing and control means 22, in the following step 150, process the image by defining its real contours in comparison with the array of light sources constituting the light assembly, so as to select in step 160 a plurality of light sources of the array, the lighting of which implements or approximates the implementation of said lighting shape, symmetrically duplicating this selection for the specular lighting shape. The processing and control means are configured to implement predetermined image processing algorithms adapted to optimize the set lighting shape (the contour curve of the set lighting shape) in order to make it possible to implement it by means of the available light sources (which substantially represent the image forming pixels). In step 160 the processing and control means 22 further determine which of the individual light sources to activate and deactivate for the desired lighting or signaling function depending on the set lighting shape, as well as the relative color and illumination intensity, and the frequency of switching on and off, in order to control the drive means 24 in a corresponding manner.

It should be noted that the embodiment proposed for this invention in the foregoing discussion is purely by way of non-limiting example of this invention. A person skilled in the art will easily be able to implement this invention in different embodiments which do not however depart from the principles set forth herein and are therefore encompassed in this patent.

This is particularly valid in regard to the possibility of applying the invention to the case of a light assembly, the overall lighting area of which is not continuous, but is formed by contiguous areas, for example an area incorporated in the vehicle body and an area incorporated in the rear hatch of the trunk.

Naturally, without prejudice to the principle of the invention, the manufacturing details and the embodiments may vary widely compared to that which is described and illustrated purely by way of a non-limiting example, without departing from the scope of this invention as defined in the appended claims.

The invention claimed is:

1. A system for controlling a light assembly of a vehicle, the system comprising a light assembly including an array of light sources adapted to perform at least one lighting or light-signaling function of the vehicle, said array of light sources comprising sub-arrays of light sources for respective lighting or light-signaling functions, the system further comprising:
light configuration means of the light assembly, configured to acquire from a user a lighting shape of said array of light sources, associated with a predetermined lighting or light-signaling function of the light assembly;
processing and control means residing on board the vehicle and coupled to said light assembly, adapted to receive data indicative of said lighting shape and to select a plurality of light sources of said array, lighting of which implements or approximates an implementation of said lighting shape; and
drive means for controlling said array of light sources, adapted to control activation of the plurality of light sources selected to perform said predetermined lighting or light-signaling function,
wherein said light configuration means include a user interface computer environment arranged for setting said lighting shape of said array of light sources within a programmable area defined in an overall area of the light assembly and for remotely sending said data indicative of said lighting shape to said processing and control means,
wherein said user interface computer environment is arranged for comparing the acquired lighting shape in the programmable area defined in the overall area of the light assembly with predetermined size, shape and light intensity constraints and with an available lighting area of the sub-arrays intended for the lighting or light-signaling function associated with said lighting shape, and for rejection of said lighting shape if the lighting shape is not entirely comprised within said available lighting area,
wherein said user interface computer environment is arranged for comparing the acquired lighting shape of said array of light sources with a collection of inadmissible lighting shapes including lighting shapes not conforming to predetermined standardized shape homologation features for the related lighting or light-signaling function, the processing means being configured to reject said acquired lighting shape if the acquired lighting shape corresponds to an inadmissible lighting shape.

2. The system of claim 1, wherein said user interface computer environment is arranged for setting a plurality of lighting shapes of said array of light sources, associated with a predetermined lighting or light-signaling function of the light assembly, and for associating each of the lighting shapes to a corresponding selection condition.

3. The system of claim 2, wherein said selection condition includes at least one among a time, a place, and a driving condition.

4. The system of claim 1, wherein said processing and control means are configured to compare an arrangement of said plurality of selected light sources, the activation of which is intended to obtain said predetermined lighting or light-signaling function, with a collection of inadmissible lighting arrangements including lighting arrangements not conforming to predetermined standardized shape homologation features for the related lighting or light-signaling function, the processing and control means being configured to reject said lighting arrangement if the light arrangement corresponds to an inadmissible lighting arrangement.

5. The system of claim 1, wherein said user interface computer environment is implemented as an application residing on a personal mobile telecommunication device.

6. The system of claim 1, wherein said processing and control means are adapted to select a plurality of light sources of the sub-array of said array intended for the lighting or light-signaling function associated with said lighting shape, the illumination of which implements or approximates the implementation of said lighting shape.

7. The system according of claim 1, wherein said light sources are monochromatic light emitting diodes (LEDs).

8. The system according of claim 1, wherein said light sources are polychromatic light emitting diodes (LEDs).

9. The system of claim 7, wherein said drive means are adapted to control light intensity level of the plurality of light sources selected to perform said predetermined lighting or light-signaling function.

10. The system of claim 8, wherein said drive means are adapted to control color of the plurality of light sources selected to perform said predetermined lighting or light-signaling function.

11. The system of claim 7, wherein said drive means are adapted to intermittently control switching on and off of the plurality of selected light sources at an intermittence time interval lower than retinal persistence time.

* * * * *